April 5, 1966 F. A. SOLSKI ETAL 3,244,032
DRILL HEAD AND CONTROL THEREFOR
Filed March 14, 1963 6 Sheets-Sheet 1
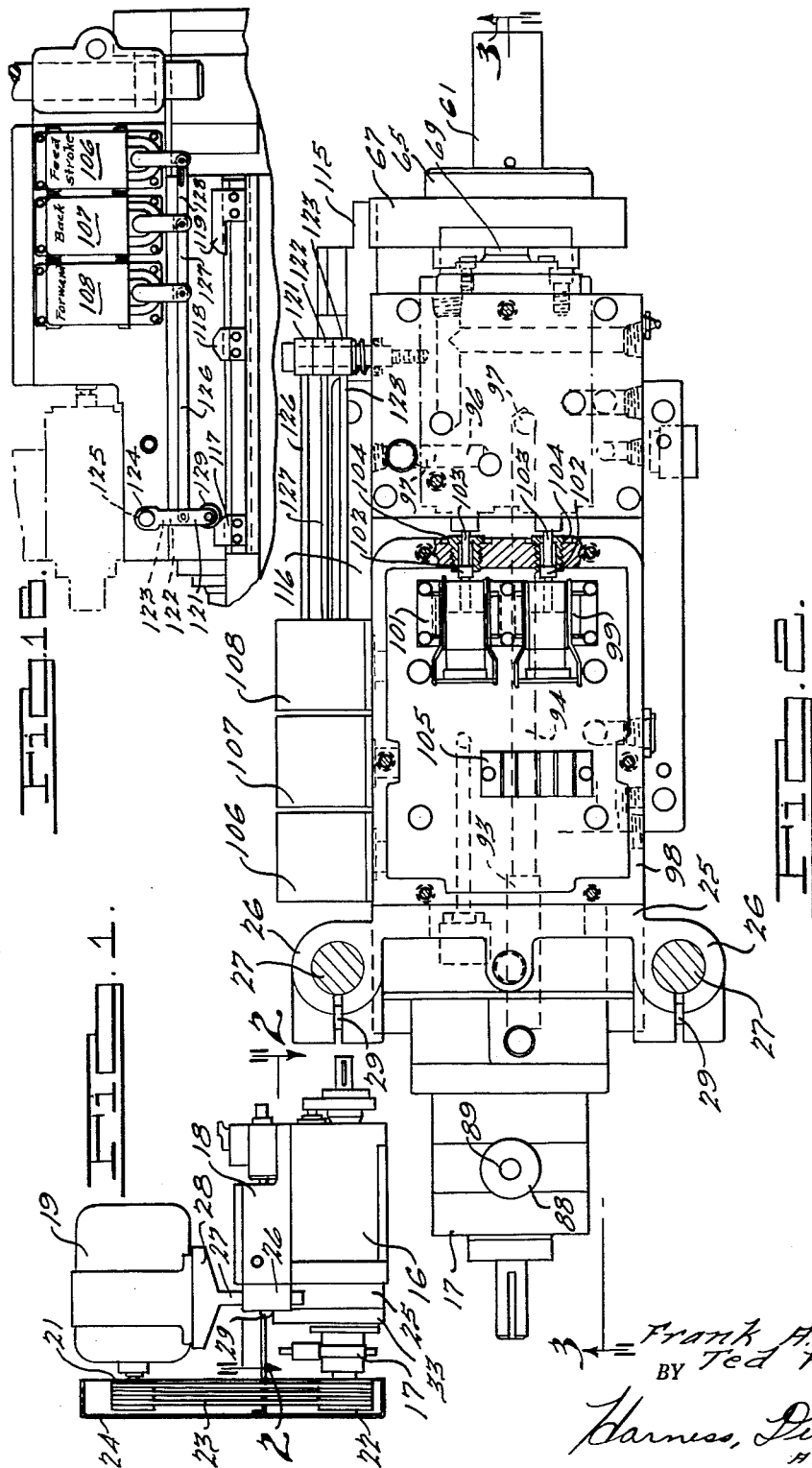
INVENTORS.
Frank A. Solski
BY Ted Paczas.
Harness, Dickey & Pierce
ATTORNEYS

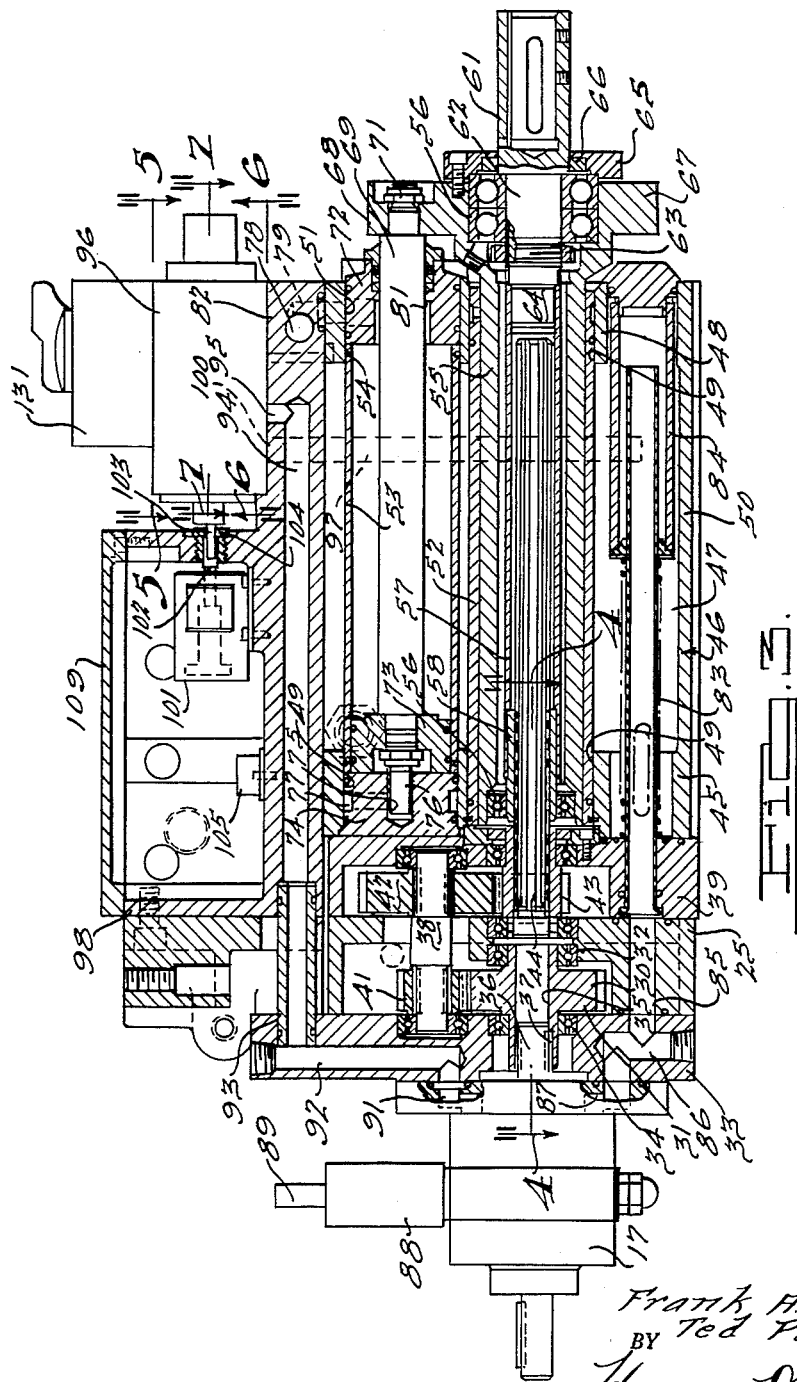

INVENTORS:
Frank A. Solski
BY Ted Paczas.
Harness, Dickey & Pierce
ATTORNEYS

INVENTORS.
Frank A. Solski
BY Ted Paczas.
Harness, Dickey & Pierce
ATTORNEYS.

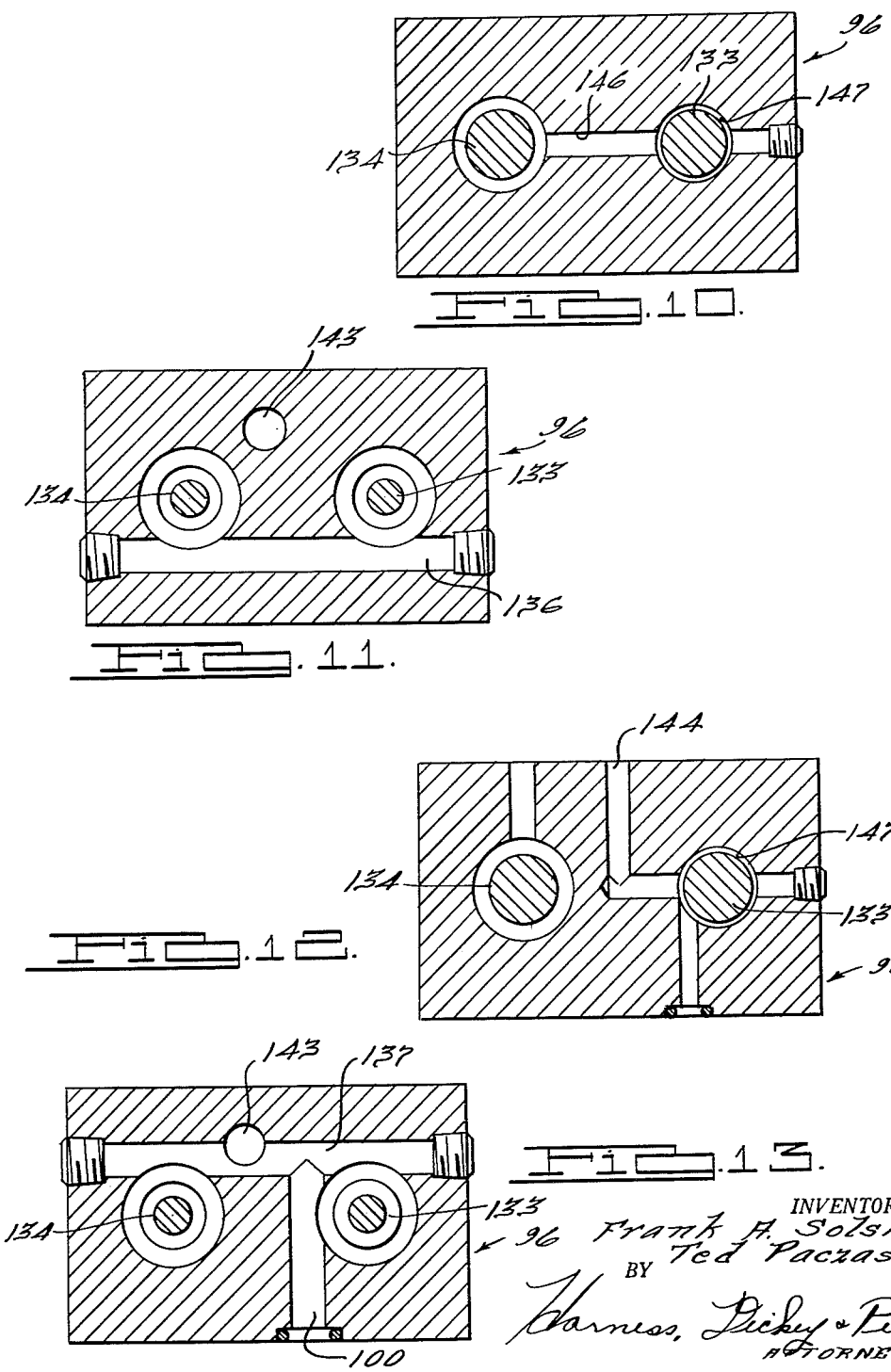

April 5, 1966   F. A. SOLSKI ETAL   3,244,032
DRILL HEAD AND CONTROL THEREFOR
Filed March 14, 1963   6 Sheets-Sheet 6
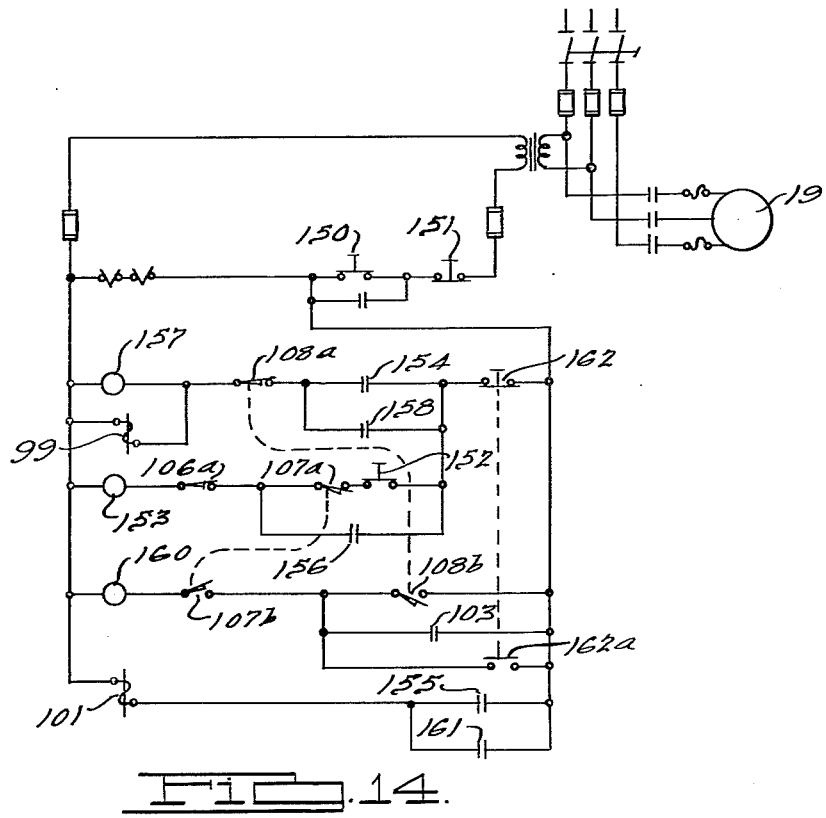
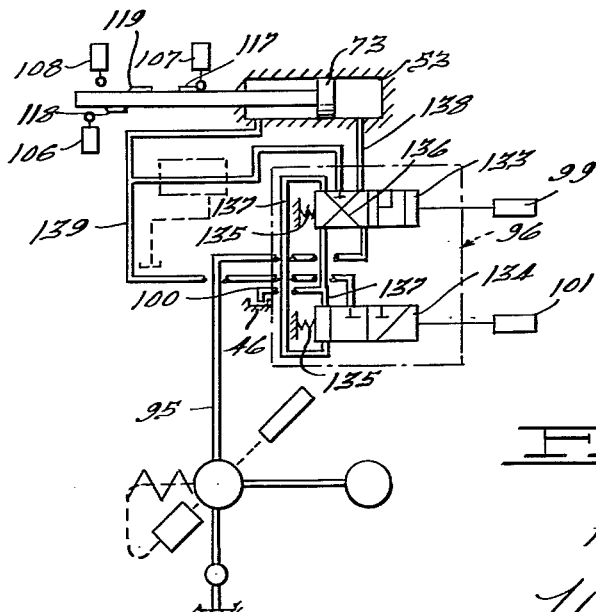
INVENTORS
Frank A. Solski
Ted Paczas
BY
Harness, Dickey & Pierce
ATTORNEYS

United States Patent Office 3,244,032
Patented Apr. 5, 1966

3,244,032
DRILL HEAD AND CONTROL THEREFOR
Frank A. Solski, Dearborn, Mich. (5349 Van Ness Court, Bloomfield Hills, Mich.), and Ted Paczas, 1925 Forest Lane, Birmingham, Mich.
Filed Mar. 14, 1963, Ser. No. 265,115
6 Claims. (Cl. 77—32.8)

This invention pertains to drilling devices, and particularly to a device having a drill support which rapidly advances the drill toward the work, slowly feeds the drill to the required depth in the work, and rapidly retracts the drill therefrom.

The device of the present invention is of simple construction comprising a rotatable drill supporting spindle which is advanced and retracted by a piston rod toward and from the workpiece. Controls are provided on the device by which the rapid advancement of the drill into engagement with the work first occurs, followed by a slow advancement during the drilling operation, the speed chosen to conform to the material being drilled. The advancement is stopped when the depth of hole has been reached conforming to the setting of the controls. After depth has been reached, the spindle and drill are rapidly retracted to their initial positions to complete the operation. The positive control for producing the rapid advancement and retraction and the feed advancement for drilling save substantial time and prevent the breakage and dulling of the drill. Limit switches are employed which control the position of a valve to produce the rapid forward advance to position the drill adjacent to the workpiece, after which a flow control valve regulates the advancement at a speed which may be varied from zero to 30" per minute for normal drilling operation. After advancing the drill to depth, a switch produces the actuation of the valve to reverse the flow of fluid, by-passing the flow control valve, and producing the rapid retraction of the drill to its initial position. The rapid advancement and return of the drill spindle occurs at a rate between 250 and 300 inches per minute. It is to be understood that the rates herein given are the normal rates employed and that these rates may be set to any desired amount, depending upon the size of the piston and the rate of fluid flow thereto. The system is normally set up to produce a flow of fluid at a maximum pressure of 1000 pounds per square inch. The spindle head is driven in rotation through a spline shaft which is directly connected to a pump shaft having driving means thereon operated by a motor supported by the assembly. In this manner, a self-contained, compact unit is provided which may be mounted horizontally for horizontal approach and retraction or vertically for downward and upward movement.

Accordingly, the main objects of the invention are: to provide a self-contained, compact unit which delivers oil under pressure for advancing a drill rapidly to drilling position, advancing it slowly for performing the drilling operation, and retracting it rapidly to its initial position; to provide a self-contained drill unit having driving means for the pump and drill producing a flow of fluid which controls the speed for advancing and retracting the drill and for performing the drilling operation, and, in general, to provide a drilling mechanism which is self contained, which is compact and rugged, and which performs a drilling operation in an exceedingly short time.

Other objects and features of novelty of the invention will be specifically pointed out or will become apparent when referring, for a better understanding of the invention, to the following description taken in conjunction with the accompanying drawings, wherein:

FIGURE 1 is a view of a self-contained drilling unit embodying features of the present invention;

FIG. 2 is an enlarged sectional view of the structure illustrated in FIG. 1, taken on the line 2—2 thereof;

FIG. 3 is a sectional view of the structure illustrated in FIG. 2, taken on the line 3—3 thereof;

FIG. 10 is a sectional view of the structure illustrated in FIG. 7, taken on the line 10—10 thereof;

FIG. 11 is a sectional view of the structure illustrated in FIG. 7, taken on the line 11—11 thereof;

FIG. 12 is a sectional view of the structure illustrated in FIG. 7, taken on the line 12—12 thereof;

FIG. 13 is a sectional view of the structure illustrated in FIG. 7, taken on the line 13—13 thereof;

FIG. 14 is a wiring diagram of the electrical control employed upon the device illustrated in FIG. 1; and FIG. 15 is a diagrammatic view of the fluid system of the device illustrated in FIG. 1, and FIG. 16 is a broken plan view of the structure illustrated in FIG. 2.

Figure 4:
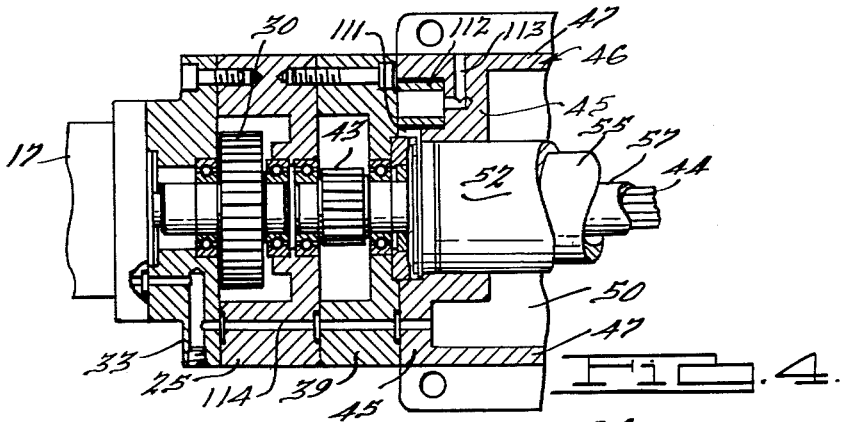
FIG. 4 is a sectional view of the structure illustrated in FIG. 3, taken on the line 4—4 thereof.
Figure 5:
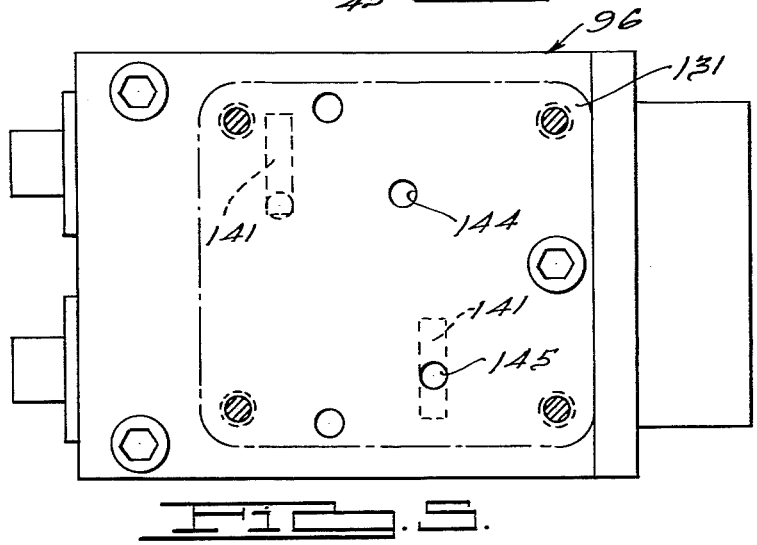
FIG. 5 is an enlarged sectional view of the structure illustrated in FIG. 3, taken on the line 5—5 thereof.
Figure 6:
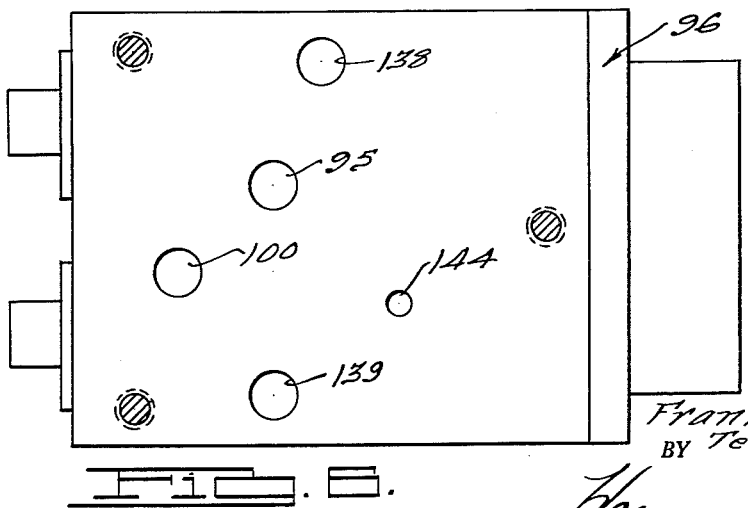
FIG. 6 is an enlarged sectional view of the structure illustrated in FIG. 3, taken on the line 6—6 thereof.

The drilling device of the present invention embodies a drill head 16, a pump 17 in driving relation therewith, a fluid and electric control component 18, a motor 19 for driving the pump 17 through the pulleys 21 and 22 interconnected by a plurality of belts 23 which may be shielded by a guard 24. A main supporting housing 25 has a pair of bosses 26 thereon for receiving arms 27 on a motor supporting bracket 28 to which the motor 19 is secured and adjusted in the bosses 26 for providing tension on the belts 23 retained by the locking screws 29. A driving gear 30 is mounted in the housing 25 on a bearing 32 and in a cover plate 33 by a bearing 34. The gear has a central aperture 35 in which the driving shaft 36 from the pump 17 extends and is secured by keys 37. A shaft 38 is also supported in the plate 33 and in a plate 39 on the opposite side of the housing 25. A gear 41 is mounted on the shaft 38 having teeth in mesh with the teeth of the gear 30, while a gear 42 on the opposite end of the shaft 38 meshes with a gear 43 which drives a spline shaft 44. It is to be understood that suitable bearings are employed for supporting the gear 43 and spline shaft, as clearly illustrated in the drawings. The head 45 of a main housing 46 is secured to the plate 39. The head 45 has a bottom wall 50 and two side walls 47 extending therefrom and closed at the opposite end by a head 48. The heads 45 and 48 have a pair of aligned apertures 49 and 51 in which cylinders 52 and 53 are secured and sealed by O-rings 54.

The cylinder 52 slidably supports a cylinder 55 having bearings 56 at opposite ends for rotatably supporting a hollow tube 57 which extends over the spline shaft 44. The upper end of the tube 57 has a sleeve 58 provided with internal splines which are in mated relation to the splines of the shaft 44. The end of the sleeve 57 has a drill-receiving arbor 61 which has a shaft portion 62 secured to the inner race of the lower bearing 56 by a nut 63. An extension 64 of the shaft 62 is secured to the end of the sleeve 57 in driving relation therewith. A plate 65 having a seal 66 thereon surrounds the arbor 61 and seals the head 67 which is a part of the cylinder 55. A projecting portion 68 of the plate 67 is fixed to the end of a piston rod 69 by a nut 71, the rod being sealed in a head 72 which encloses the forward end of the cylinder 53. The opposite end of the rod is secured to a piston 73 which is in sealing relation to the walls of the cylinder 53. The rearward or opposite end of the cylinder 53 has a plug 74 sealed therein and provided with a central aperture 75 in which the cylindrical end 76 of the piston rod 69 extends for the purpose of cushioning the return stroke of the rod. Fluid is admitted into an annular groove 77 in the plug 74 and radial passageways therefrom deliver the fluid to the central cylindrical aperture 75 for moving the piston forwardly. Fluid is admitted from the aperture 78 to a passageway 79 and to a clearance area 81 about the piston rod 69 for retracting the piston and rod.

The casing 46 is closed at the top by a manifold plate 82 and fill openings are provided for admitting oil to the interior of the housing 46 about the cylinders 52 and 53. An outlet tube 83 is sealed into an aperture in the plate 39 and extends substantially to the bottom end of the housing 46 where it is surrounded by a filter 84 of conventional design. An aperture 85 in the plate 25 communicates with the passageway from the tube 83 to an aperture 86 of the plate 33 from which an aperture 87 delivers the fluid to the pump 17. The pump is of conventional design to deliver a pressure of substantially 1000 pounds controlled by a pressure regulating valve 88 which is a part of the pump assembly having a rod 89 by which adjustment is made. The pump delivers fluid from a pasageway 91 to a passageway 92 and through a sleeve 93 into a passageway 94 in the manifold plate 82. Fluid is delivered to a branch passageway 95 to a valve 96 which controls the delivery of fluid to and from the opposite ends of the cylinder 53. A return aperture 100 in the manifold plate 82 communicates with a return pipe 97 which extends into the housing 46 adjacent to the filter 84.

The manifold plate 82 has a housing 98 extending upwardly therefrom in which a pair of solenoids 99 and 101 are mounted. The solenoids have operating shafts 102 joined to valve operating plungers 103 located within bushings 104 which are threaded in one end of the housing 98. A terminal block 105 within the housing 98 provides means for interconnecting the solenoid and three limit switches 106, 107 and 108 into an electric circuit. The switches are attached to a side wall of the housing 98 which is enclosed by a cover 109. The cylinder 55 moves inwardly and outwardly of the cylinder 52 and a breather passageway 111 (see FIG. 4) is located at the end 45 of the housing 46, the air first passing through a filter 112 after entering the passageway 113 from atmosphere. In FIG. 4 a return passageway 114 is illustrated which delivers the fluid from the pressure control valve 88 to the interior of the housing 46.

The head 67 of the cylinder has a cam rod 115 secured thereto, the rod being movable longitudinally in ways 116 at one side of the housing 46. The cam rod 115 has a return cam 117, a feed cam 118 and an advancing cam 119 mounted thereon. Three arms 121, 122 and 123 are supported on a stud 124 and urged together by a spring 125 to provide friction which retains an arm in adjusted position. The arms have links 126, 127 and 128 pivoted thereto. The link 128 is joined to the operating arm of the limit switch 106 which controls the feed stroke. The link 127 is connected to the operating arm of the limit switch 107 which controls the return stroke. The link 126 is connected to the operating arm of the limit switch 108 which controls the forward stroke. A roller 129 is mounted on each of the arms 121, 122 and 123. The cam element 117 is aligned with the central arm 122 to which the link 127 is pivoted for actuating the limit switch 107 to produce the return movement and is therefore positioned inwardly to engage the roller 129 of the arm. The cam 118 engages the roller 129 on the arm 123 positioned adjacent to the side of the housing 46 and actuates the link 128 and the limit switch 106 for controlling the feed stroke. The outermost cam 119 is positioned to engage the roller 129 on the outermost arm 121 for actuating the link 126 and the limit switch 108 for controlling the forward movement of the head 67.

Referring more specifically to FIGS. 1, 5 to 13 and 15, the valve 96 and the fluid circuit will now be described in detail. The valve 96 has a body 132 and a pair of longitudinally shiftable spools 133 and 134 which are actuated to the right by the solenoid plungers 103 against the bias of springs 135. The spool 134 controls the passage of fluid from the intake port 95, while the spool 133 controls the flow of fluid into the port 100 which delivers the oil back to the housing 46. The valve is illustrated in "stop" position where the flow of fluid from the passageway 95 passes through passageways 136 and 137 to the passageway 100 and back to the reservoir. When a drilling operation is to be performed, both of the solenoids 99 and 101 are energized to thereby advance both of the spools 133 and 134 to the right. In this arrangement, the fluid entering the passageway 95 passes through a passageway 138 to the slot 77 of the head 74 at the rear end of the cylinder 53, to thereby advance the piston 73 forwardly. The oil forwardly of the piston passes out through the passageways 78 and 79 into the passageway 139 and then through passageways 136 and 137 through a passageway 100 and the return pipe 99 to the housing 46. There is no restriction to this passage of the oil so that the rapid advancement of the piston occurs. Just before the drill reaches the work, the solenoid 99 is de-energized, permitting the spool 133 to shift to the left so that the returned fluid from the forward end of the piston entering passageway 139 will pass from the passageway 140 into the flow control valve 131 which is adjusted to meter the fluid which, upon passing from the valve 131, enters the passageway 141 of the spool 134 from which it will flow into the passageway 100 into the housing 46. Thus, the feed of the drill is controlled during the drilling operation through the metering of the fluid from the forward end of the cylinder 53 by the flow control valve 131.

Figure 7:
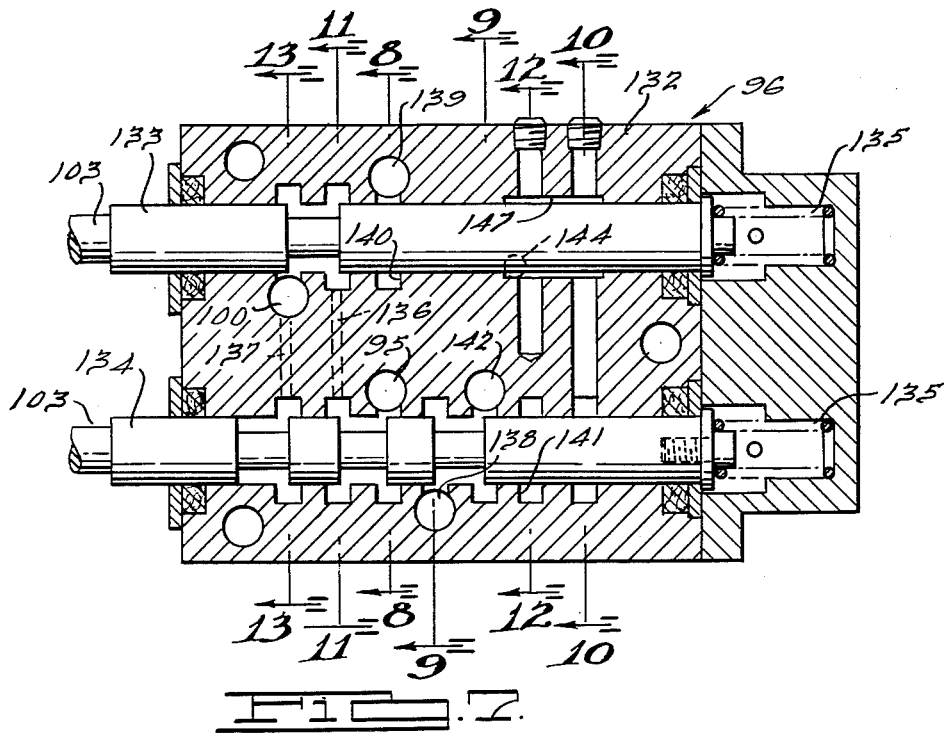
FIG. 7 is an enlarged sectional view of the structure illustrated in FIG. 3, taken on the line 7—7 thereof.
Figure 8:
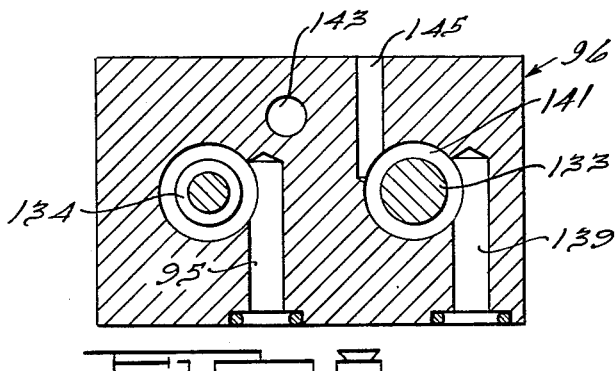
FIG. 8 is a sectional view of the structure illustrated in FIG. 7, taken on the line 8—8 thereof.
Figure 9:
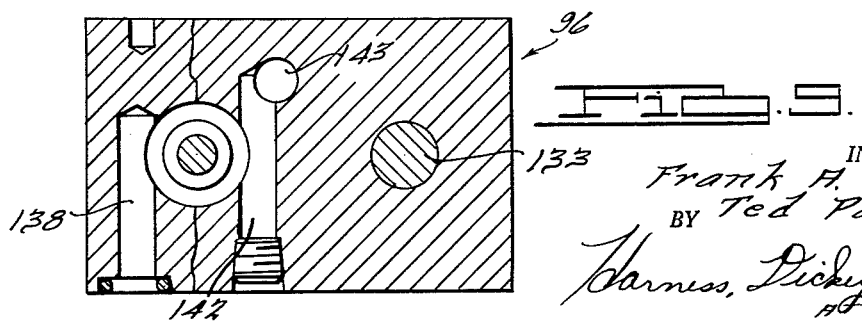
FIG. 9 is a sectional view of the structure illustrated in FIG. 7, taken on the line 9—9 thereof.

At the end of the drilling operation, the cam 117 engages the roller of the arm 122 to actuate the limit switch 107 to energize the solenoid 99 and de-energize the solenoid 101, to thereby move the spool 133 to the right, permitting the spool 134 to move to the left. The fluid delivered through the passageway 95 now will pass through the passageway 136 and out of the passageway 139 to the forward end of the cylinder 53 to thereby move the piston 73 to the left. The fluid in the rear of the piston will enter the passageway 138 and move out of a passageway 142 which is connected with the passageway 137 to thereby enter the passageway 100 and flow into the housing 46. When the piston reaches the end of the return stroke, all of the limit switches 106, 107 and 108 are de-energized, de-energizing the solenoids 99 and 101, permitting the springs 135 to shift the spools 133 and 134 to the left to the initial position, as illustrated in FIG. 7, to thereby complete the drilling operation. The fluid from the flow control valve 131 passes outwardly therefrom through a passageway 145 into passageways 143 and 100 to the housing 46. Any fluid which leaks past the flow control valve is passed to the housing 46 through a passageway 144. Any fluid leaking by either of the spools 133 and 134 will connect through a passageway 146 to a reservoir 147 and will then flow into the housing 46 from the passageway 144. The cross-over passageway 136 interconnecting the two spools is illustrated in FIG. 11.

A wiring diagram is illustrated in FIG. 14 showing the motor 19 wired in the circuit in the usual manner. The motor herein illustrated has a rating of one horsepower and operates at approximately 1800 r.p.m. The motor is started by a switch 150 protected by a stop switch 151. When the motor is operating and fluid is circulating from and to the housing 46, the operation of a switch 152 causes the piston 73 to move forward, thereby moving the cam 117 out of engagement with the switch 107, thereby opening the contacts 107A and closing contacts 107B. The piston continues to advance until the limit switch 106 is operated by cam 118 to open the contacts 106A, thereby de-energizing the solenoid 153 and opening contacts 154, 155 and 156. The drilling operation will then proceed with slow speed until the cam 119 operates the switch 108 to open contacts 108A and to close contacts 108B. The closing of contacts 108B energizes a relay 160 which closes contacts 161, thereby energizing the solenoid 101 which shifts the spool 133 to the right. The opening of the contacts 108A de-energizes the solenoid 99, permitting the spool 134 to be moved to the left. This is in the position in which the fluid is reversed in the cylinder 53 to return the piston 73 to the rear. Just before reaching the rear, the cam 117 operates the switch 107 to again close the contacts 107A and open the contacts 107B which de-energizes the solenoid 101 to permit the spool 133 to shift to the left, terminating the oil flow to the cylinder 53 and positioning the spools of the valve at stop position, as illustrated in FIG. 7. A switch 162 is provided for manually stopping the forward advancement of the drill at any time. The operation of the switch 162 opens one circuit therethrough and closes contacts 162A, thereby causing the relay 160 to be energized through closed contacts 107B to have the solenoid 101 energized to thereby cause a return movement of the drill to immediately occur. The pump for supplying fluid is preferably of the vane type which is procurable in the trade having the regulating valve 88 and also a shiftable compression ring which produces a desired volume flow of oil. The pump is preferably so constructed that when the pressure reaches an abnormal amount, the ring will tend to center itself so as to reduce the volume being delivered to a small amount.

What is claimed is:

1. In a drilling device wherein a drill is rotated and advanced by a piston within a cylinder toward the workpiece to perform a drilling operation, a pump on said device for delivering a fluid, a valve on said device embodying a pair of spools for controlling the portage of the fluid, a pair of solenoids for shifting the spools longitudinally against the pressure of an associated spring, a variable flow control valve in the return passageway at the forward end of the cylinder, means for energizing said solenoids initially to shift both spools and advance the drill toward the work at a rapid speed, means actuated by the advancement of the head for de-energizing one of said solenoids to have its associated spool shifted to permit the exhaust fluid from the forward end of the cylinder to pass through the control valve to thereby produce a lower speed of movement to the drill during the drilling operation, means thereafter for de-energizing the energized solenoid and for energizing the de-energized solenoid to shift the spools to reverse the flow of the fluid in the cylinder and retract the drill from the work and return it to its initial position at fast speed, and means carried by the advancing movement of the drill to control the energization and de-energization of the solenoids.

2. In a device having a head which has an advancing and feed movement toward the work and a retracting movement therefrom, a valve having passageways altered by a pair of longitudinally movable spools, and a pair of solenoids for moving said spools against pressure exerting means which returns the spools upon the de-energization of the solenoids to their initial positions, means for energizing both of the solenoids for advancing both spools to produce a large flow of fluid and the rapid advance movement of the head, means for de-energizing one of the solenoids by the movement of the head to produce a reduced flow of fluid and the feed movement of the head at a slower speed, and means actuated by the further advance movement on the head to de-energize the last said solenoid and to energize the other solenoid to produce the rapid return movement of the head.

3. In a device having a head which has an advancing and feed movement toward the work and a retracting movement therefrom, a valve having passageways altered by a pair of longitudinally movable spools, a pair of solenoids for moving said spools against pressure exerting means which returns the spools upon the de-energization of the solenoids to their initial positions, means for energizing both of the solenoids for advancing both spools to produce a large flow of fluid and the rapid advance movement of the head, means for de-energizing one of the solenoids by the movement of the head to produce a reduced flow of fluid and the feed movement of the head at a slower speed, and means actuated by the further movement of the head for de-energizing the last said solenoid and energizing the other solenoid to produce the rapid return movement of the head, said means controlling the energization and de-energization of the solenoids embodying three micro switches, and said head having means thereon for operating said switches during the advancement of the head.

4. A drilling head having a hollow housing with a wall at each end, a spindle carried by said walls for movement from one end of the housing, drive means on the opposite end of the housing for rotating said spindle, a cylinder within said housing having a piston for moving a rod connected to said spindle for producing the advancement and retraction thereof, a pump forward of said driving means connected thereto, motor means for driving said pump, said pump pressurizing the fluid within the housing, a valve having a pair of shiftable spools to which the fluid is delivered, a pair of solenoids for operating said spools, limit switches controlled by the position of said spindle for energizing said solenoids and controlling the passage of fluid to and from said cylinder, a circuit interconnecting said limit switches and said solenoids whereby to energize both the solenoids for producing the rapid advancement of the spindle, an adjustable flow control valve, means for de-energizing one of said solenoids for passing the return fluid from the cylinder through said flow control valve to produce a slow feed movement to the spindle, and means for de-energizing the energized solenoids and energizing the de-energized solenoids for producing the rapid return of said spindle.

5. In a drilling head, a housing having bottom, side and end walls forming a reservoir for fluid, a drill head rotatably supported on said end walls, a ram supported by the end walls and connected to the drill head for producing its advancement and retraction from and toward said housing, a pump supported on one end wall in driving relation to the rotatable support of said drill head, said walls having passageways leading to opposite ends of said ram, driving means for said pump which drives the drill head directly through said pump, a manifold plate enclosing said housing having a passageway therein joined to the pump, and a valve mounted on said manifold plate having passageways joined to the passageways thereof.

6. In a drilling head, a housing having bottom, side and end walls forming a reservoir for fluid, a drill head, a ram supported by the end walls and connected to the drill head for producing its advancement and retraction, driving means for rotating said head supported on one of said walls, said walls having passageways leading to opposite ends of said ram, a pump connected to said head and driven by said driving means, a manifold plate enclosing said housing having a passageway therein joined to the pump, a valve mounted on said manifold plate having passageways joined thereto, an adjustable flow control valve mounted on said first valve, said first valve having a pair of longitudinally movable spools therein, a pair of solenoids for shifting said spools, a plurality of limit switches controlling the energization of said solenoids for producing a flow of fluid to and from said ram, and means actuated by the movement of said ram for controlling the operation of said limit switches.

References Cited by the Examiner
UNITED STATES PATENTS

| | | | |
|---|---|---|---|
| 2,210,665 | 8/1940 | Harrington | 91—459 X |
| 2,550,148 | 4/1951 | Harding | 77—32.8 X |
| 2,559,125 | 7/1951 | Lee. | |
| 3,129,645 | 4/1964 | Olmsted | 137—625.64 X |

WILLIAM W. DYER, JR., *Primary Examiner.*

FRANCIS S. HUSAR, *Examiner.*